United States Patent [19]
Gentry et al.

[11] Patent Number: 5,573,269
[45] Date of Patent: Nov. 12, 1996

[54] APPARATUS AND METHOD FOR SENSING AND RESTRAINING AN OCCUPANT OF A VEHICLE SEAT

[75] Inventors: Scott B. Gentry, Romeo; Brian K. Blackburn, Rochester; Joseph F. Mazur, Washington, all of Mich.

[73] Assignee: TRW Vehicle Safety Systems Inc., Lyndhurst, Ohio

[21] Appl. No.: 161,772

[22] Filed: Dec. 2, 1993

[51] Int. Cl.⁶ .................................................. B60R 21/26
[52] U.S. Cl. ........................... 280/735; 280/734; 180/271
[58] Field of Search ..................................... 280/735, 734, 280/731, 732, 728 R, 739; 180/273, 271

[56] References Cited

U.S. PATENT DOCUMENTS

| | | | |
|---|---|---|---|
| 5,074,583 | 12/1991 | Fujita et al. | 280/735 |
| 5,161,820 | 11/1992 | Vollmer | 280/735 X |
| 5,184,845 | 2/1993 | Omura | 280/739 |
| 5,232,243 | 8/1993 | Blackburn et al. | 280/732 |
| 5,398,185 | 3/1995 | Omura | 280/735 X |
| 5,404,128 | 4/1995 | Ogino et al. | 180/273 |
| 5,413,378 | 5/1995 | Steffens et al. | 280/735 |

FOREIGN PATENT DOCUMENTS 2243533  11/1991  United Kingdom .

Primary Examiner—Christopher P. Ellis
Attorney, Agent, or Firm—Tarolli, Sundheim, Covell, Tummino & Szabo

[57] ABSTRACT

An apparatus (10) for sensing and restraining an occupant of a vehicle seat (34) includes a weight sensor (60) and a seat incline sensor (62). The weight sensor (60) senses a sensed weight of the occupant of the seat (34). The sensed weight differs from the actual weight of the occupant. The incline sensor (62) senses a characteristic which affects the difference between the sensed weight and the actual weight of the occupant. The apparatus (10) further includes a controller (36) and an inflatable vehicle occupant restraint (26). The controller (36) determines a computed weight of the occupant as a function of both the sensed weight and the characteristic. Inflation fluid is directed into the restraint (26) to inflate the restraint (26) and is controlled in response to the computed weight determined by the controller (36).

41 Claims, 3 Drawing Sheets

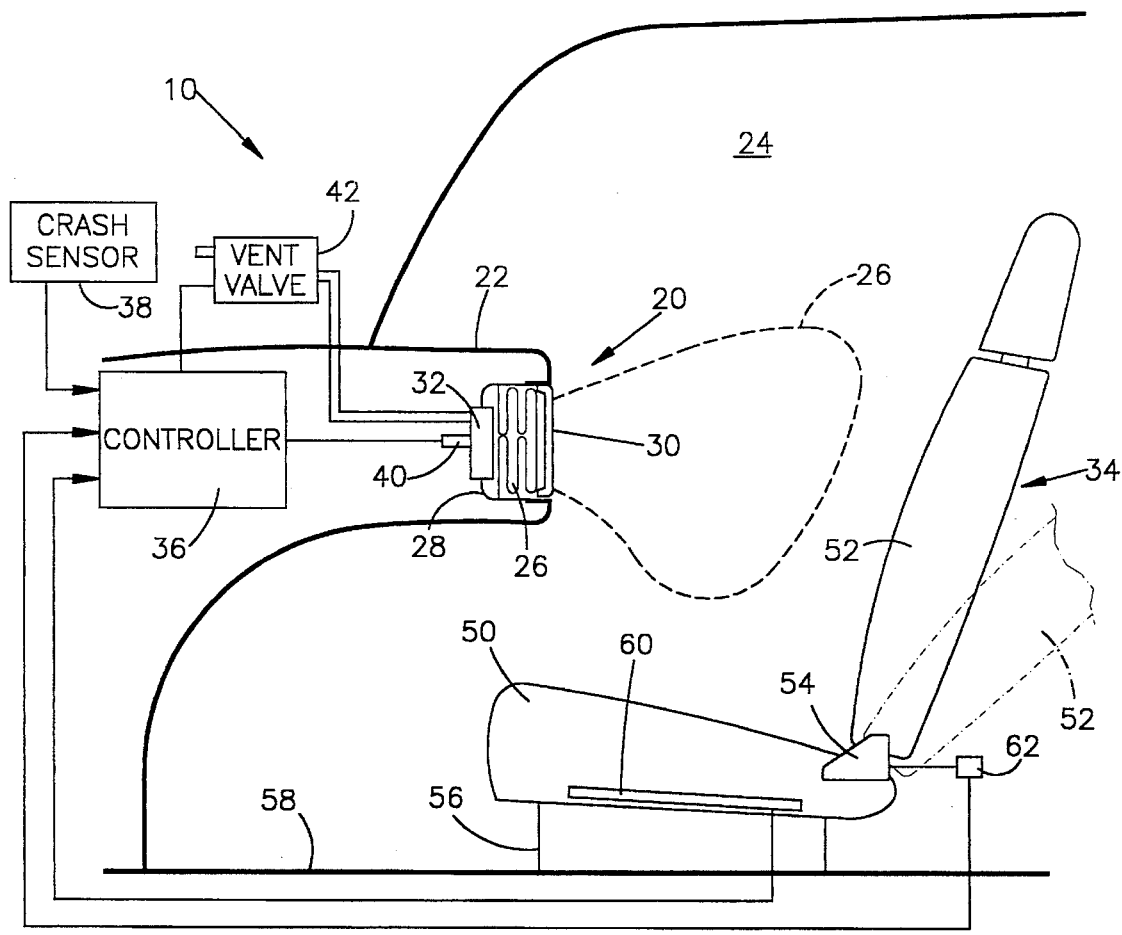
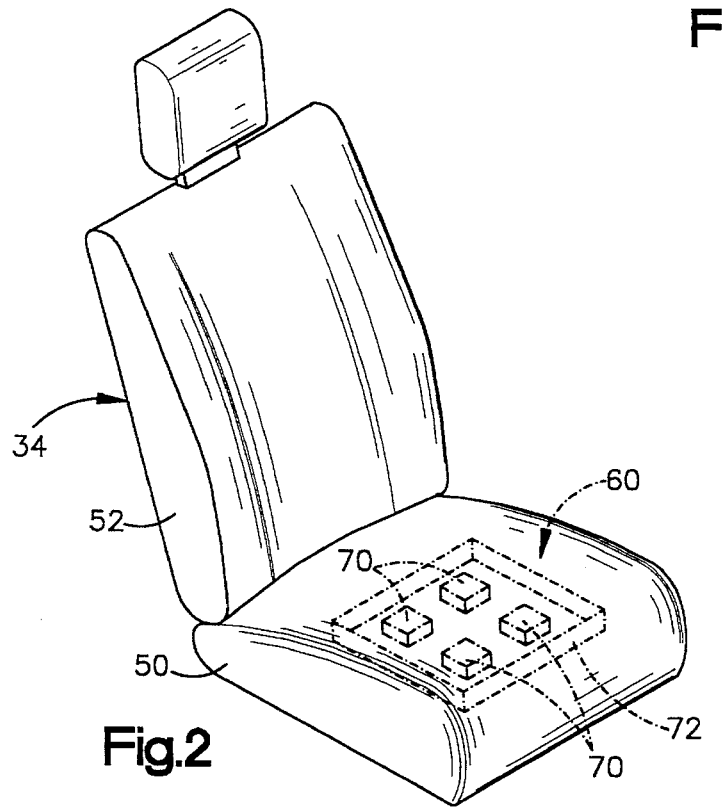

5,573,269

APPARATUS AND METHOD FOR SENSING AND RESTRAINING AN OCCUPANT OF A VEHICLE SEAT

BACKGROUND OF THE INVENTION

The present invention relates to an apparatus and method for sensing the weight of an occupant of a vehicle seat, and particularly relates to an apparatus and method for sensing the weight of the occupant and for controlling an occupant restraint system in accordance with the weight of the occupant.

BACKGROUND OF THE INVENTION

U.S. Pat. No. 5,232,243 discloses an apparatus for sensing the weight of a vehicle occupant and for restraining the occupant in the event of sudden vehicle deceleration indicative of a crash. The apparatus disclosed in the '243 patent includes an occupant weight sensor which is mounted in a vehicle seat. The weight sensor provides an output signal which indicates a sensed weight of the occupant of the seat. The apparatus further includes an inflatable vehicle occupant restraint, a source of inflation fluid for inflating the restraint, and a controller. When the vehicle experiences a crash, the source of inflation fluid is actuated by the controller and directs inflation fluid into the restraint to inflate the restraint. The controller receives the output signal from the weight sensor in the seat, and controls the amount of inflation fluid directed into the restraint in response to the output signal from the weight sensor. The controller thus controls the fluid pressure in the inflated restraint and the restraining force provided by the inflated restraint based on the sensed weight of the occupant.

SUMMARY OF THE INVENTION

In accordance with the present invention, an apparatus for sensing an occupant of a vehicle seat comprises a means for sensing a sensed weight of the occupant. The sensed weight differs from the actual weight of the occupant. The apparatus further comprises a means for sensing a characteristic which affects the difference between the sensed weight and the actual weight of the occupant. A controller means determines a computed weight of the occupant as a function of both the sensed weight and the characteristic.

A preferred embodiment of the present invention further includes an inflatable vehicle occupant restraint, a means for directing inflation fluid into the restraint to inflate the restraint, and a means for controlling the inflation fluid directed into the restraint in response to the computed weight of the occupant. As compared with the sensed weight, the computed weight more closely indicates the actual weight of the occupant because the characteristic which affects the difference between the sensed weight and the actual weight is considered in determining the computed weight. The inflation fluid directed into the restraint is thus controlled in accordance with a more accurate approximation of the occupant's actual weight. As a result, the inflated restraint has an internal fluid pressure and an associated capacity to provide a restraining force which is more closely related to the occupant's actual weight.

In a preferred embodiment of the present invention, the means for sensing a sensed weight of the occupant comprises a weight sensor associated with the seat. The seat includes a cushion and a support structure which supports the cushion. The sensor is located above the support structure. Preferably, the sensor is located between the support structure and the cushion.

BRIEF DESCRIPTION OF THE DRAWINGS

Further features of the present invention will become apparent to those skilled in the art to which the present invention relates from reading the following description with reference to the accompanying drawings, in which:

FIG. 1 is a schematic view of a first embodiment of the present invention which comprises an apparatus for sensing and restraining an occupant of a vehicle;

FIG. 2 is a schematic view of parts of the apparatus of FIG. 1;

DESCRIPTION OF PREFERRED EMBODIMENTS

Figure 3:
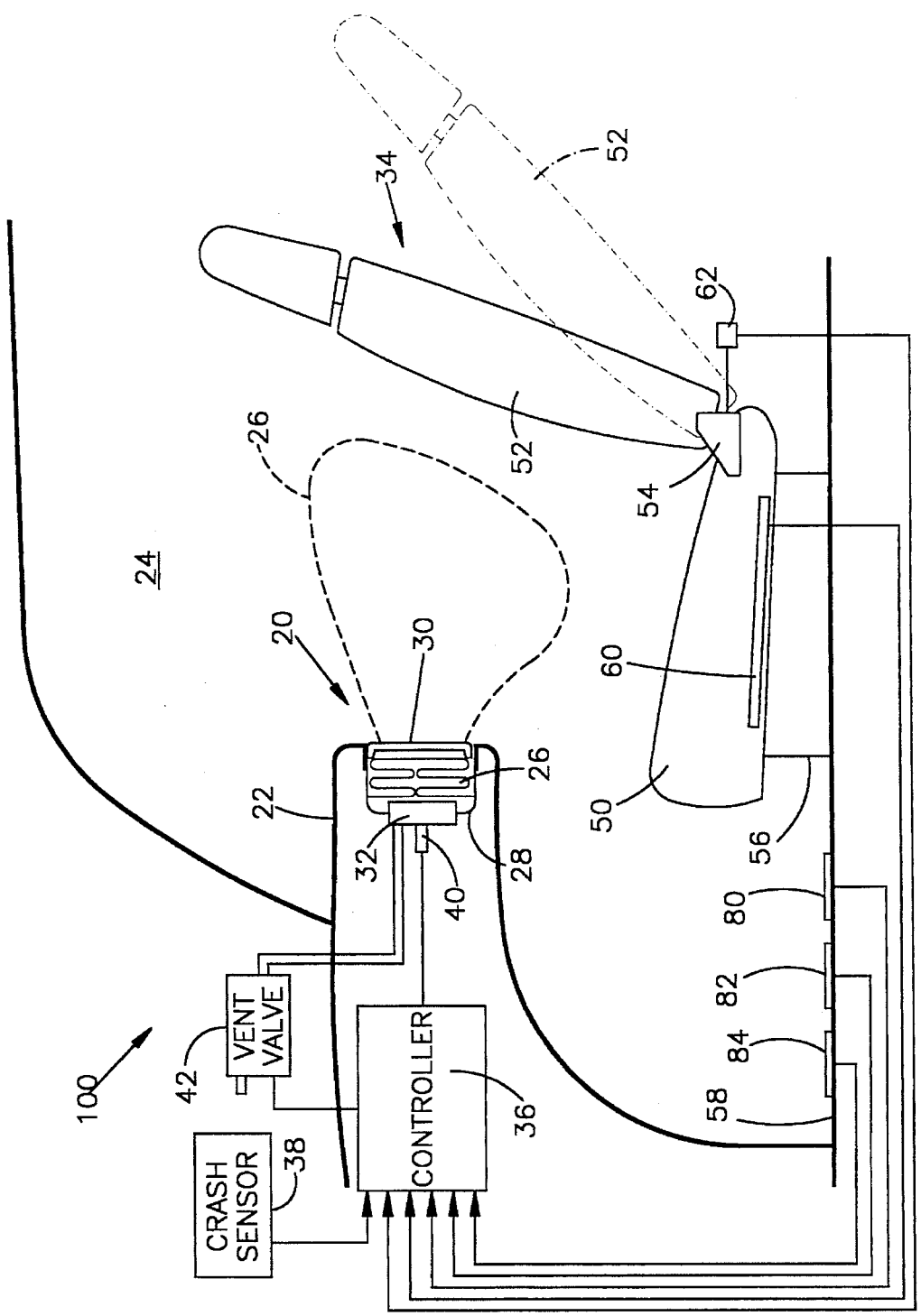
FIG. 3 is view of a second embodiment of the present invention which comprises an apparatus for sensing and restraining an occupant of a vehicle.

A first embodiment of the present invention is shown schematically in FIG. 1. The first embodiment of the invention comprises an apparatus 10 for sensing and restraining an occupant of a vehicle. The apparatus 10 includes a restraint assembly 20 mounted in an instrument panel 22 of a vehicle adjacent to the vehicle occupant compartment 24. The restraint assembly 20 includes an inflatable vehicle occupant restraint 26 which is commonly referred to as an air bag. The air bag 26 is stored in a folded condition in an air bag housing 28, as shown in solid lines in FIG. 1. A cover 30 conceals the folded air bag 26 from the occupant compartment 24 and opens easily upon inflation of the air bag 26. A source of inflation fluid, such as an inflator 32, is included in the restraint assembly 20.

When the vehicle experiences a crash, the inflator 32 is actuated and provides inflation fluid for inflating the air bag 26. The inflation fluid may be generated by combustion of pyrotechnic material or simply released from a pressurized container, as known in the art. The inflator 32 is operatively connected to the housing 28 such that the housing 28 helps direct inflation fluid from the inflator 32 into the air bag 26. The inflation fluid directed into the air bag 26 inflates the air bag 26 from the folded condition to an inflated condition in which the air bag 26 extends into the occupant compartment 24 between the instrument panel 22 and a vehicle seat 34, as shown in dashed lines in FIG. 1. The air bag 26 then restrains an occupant of the seat 34 and protects the occupant from a forceful impact with the instrument panel 22 or other parts of the vehicle.

An electronic controller 36, such as a microcomputer, is operatively connected to a vehicle crash sensor 38. The crash sensor 38 may be any of several known types. For example, the crash sensor 38 may be a mechanical inertia switch or an electrical accelerometer. If a normally open mechanical inertia switch closes, this is an indication that a crash is occurring. Likewise, if a signal from an electrical accelerometer reaches a predetermined level or a predetermined level for a predetermined time, this also is an indication that a crash is occurring. Once the controller 36 determines that a crash is occurring for which inflation of the air bag 26 is necessary to protect an occupant of the seat 34, the controller 36 actuates a squib 40 which, in turn, actuates the inflator 32.

A vent valve 42, shown schematically in FIG. 1, is operatively associated with the air bag housing 28. The vent valve 42 operates to vent inflation fluid away from the air bag 26 under the direction of the controller 36. If the vent valve 42 is fully closed upon actuation of the inflator 32, none of the inflation fluid is vented away from the air bag 26 by the vent valve 42. A maximum amount of the inflation fluid is then directed into the air bag 26. If the vent valve 42 is fully opened upon actuation of the inflator 32, a maximum amount of the inflation fluid is vented away from the air bag 26 by the vent valve 42. A minimum amount of the inflation fluid is then directed into the air bag 26. Accordingly, by controlling the degree to which the vent valve 42 is opened, the controller 36 controls the amount of inflation fluid directed into the air bag 26, and thus controls the pressure in the air bag 26 and the restraining force provided by the air bag 26.

The seat 34 includes a seat cushion assembly 50 and a seat back assembly 52. The seat back assembly 52 is adjustably supported for inclination relative to the seat cushion assembly 50 by a recliner assembly 54. The seat back assembly 52 is thus adjustable between a fully upright position, as shown in solid lines in FIG. 1, and a fully reclined position, as shown in dashed lines in FIG. 1. An adjustable seat track assembly 56 supports the seat cushion assembly 50 and the seat back assembly 52 on the floor 58 of the vehicle in a known manner.

The apparatus 10 further includes parts which enable the controller 36 to operate the vent valve 42 with reference to the weight of an occupant of the seat 34. The inflation fluid directed into the air bag 26 is thus controlled so that the air bag 26 provides a restraining force which is related to the weight of the occupant of the seat 34. Such parts of the apparatus 10 include a weight sensor 60 and an incline sensor 62, each of which is operatively connected to the seat 34.

As shown schematically in FIG. 2, the weight sensor 60 is mounted on the seat cushion assembly 50 and includes two pairs of strain gauges 70 on a flexible support structure 72. The support structure 72 may comprise a piece of spring steel or the like, and is mounted in the seat cushion assembly 50 so as to bend under the influence of the weight of an occupant of the seat 34. One of the pairs of strain gauges 70 is mounted on an upper portion of the support structure 72 that experiences compression upon such bending of the support structure 72. The other pair of strain gauges 70 is mounted on a lower portion of the support structure 72 that experiences tension upon such bending of the support structure 72. Each pair of strain gauges 70 thus responds to bending of the support structure 72 differently from the other pair. The two pairs of strain gauges 70 are connected electrically in a Wheatstone bridge configuration which develops an output signal as a function of the difference in response between the two pairs of strain gauges 70. The circuit which includes the strain gauges 70 may be of any suitable construction. The output signal of the weight sensor 60 comprises the output signal developed by the Wheatstone bridge configuration, and thus indicates the amount of bending experienced by the support structure 72 under the influence of the weight of the occupant of the seat 34.

An occupant of the seat 34 usually leans back against the seat back assembly 52. A substantial portion of the occupant's weight is thus usually applied to the seat back assembly 52 by the upper portion of the occupant's body. That portion of the occupant's weight is not transmitted to the weight sensor 60 in the seat cushion assembly 50, but instead is transmitted directly from the seat back assembly 52 to the floor 58 through the seat track assembly 56. Therefore, the weight sensor 60 is subjected only to a portion of the occupant's weight. The output signal from the weight sensor 60 thus indicates a sensed weight of the occupant which is less than the actual weight of the occupant.

The incline sensor 62 senses the inclination of the seat back assembly 52 and provides an output signal indicating the inclination of the seat back assembly 52. Such an incline sensor is known in the art. For example, the incline sensor 62 may comprise a rotary potentiometer which is operatively connected to the recliner assembly 54.

The portion of the occupant's weight that is applied to the seat back assembly 52 increases as the inclination of the seat back assembly 52 increases toward the fully reclined position. The portion of the occupant's weight that is applied to the weight sensor 60 in the seat cushion assembly 50 thus decreases as the inclination of the seat back assembly 52 increases. Accordingly, the inclination of the seat back assembly 52 is a characteristic of the vehicle that affects the difference between the occupant's actual weight and the sensed weight indicated by the output signal from the weight sensor 60. Since the output signal from the incline sensor 62 indicates the inclination of the seat back assembly 52, it indicates the effect that the occupant's reclining position has on the sensed weight. For example, for a given occupant of the seat 34, an output signal from the incline sensor 62 that indicates a relatively greater inclination of the seat back assembly 52 indicates a relatively greater difference between the actual weight of the occupant and the sensed weight.

The output signals from the weight sensor 60 and the incline sensor 62 are received by the controller 36. The controller 36 determines a computed weight of the occupant as a function of both the sensed weight and the inclination of the seat back assembly 52 as indicated by the output signals from the sensors 60 and 62. The controller 36 may have a look-up table which stores a plurality of empirical sensed weight values, a plurality of empirical inclination values, and a plurality of predetermined computed weight values. The computed weight values stored in the look-up table could be predetermined empirically and/or through computations based on a predetermined functional relationship between actual weight and the empirical values of sensed weight and inclination. The controller 36 would then identify a predetermined computed weight value corresponding to empirical values of sensed weight and inclination. Alternatively, the controller 36 could determine the computed weight by performing a computation based on a predetermined functional relationship between actual weight, sensed weight and inclination which is derived from empirical data. In either case, the computed weight determined by the controller 36 more closely approximates the actual weight of the occupant, as compared with the sensed weight indicated by the weight sensor 60, because the effect of the occupant's reclining position, which results from the inclination of the seat back assembly 52, is considered in determining the computed weight.

A first output signal from the controller 36 indicates the computed weight of the occupant, and is received by the vent valve 42. The vent valve 42 responds to the first output signal from the controller 36 by opening to a relatively greater degree when the first output signal indicates a relatively lesser computed weight, and by opening to a relatively lesser degree when the first output signal indicates a relatively greater computed weight.

When the crash sensor 38 indicates the occurrence of deceleration above a predetermined threshold indicative of a crash above a predetermined threshold, a second output signal from the controller 36 actuates the squib 40 to initiate inflation of the air bag 26 as described above. A portion of the inflation fluid which is then provided by the inflator 32 is directed away from the air bag 26 by the vent valve 42. The amount of inflation fluid that is directed away from the air bag 26 by the vent valve 42 is determined by the degree to which the vent valve 42 is opened in response to the first output signal from the controller 36. The amount of inflation fluid directed into the air bag 26 is thus controlled in accordance with the computed weight of the occupant of the seat 34 as indicated by the first output signal from the controller 36. As a result, the air bag 26 has an internal fluid pressure, and an associated capacity to provide a restraining force, which is closely related to the actual weight of the occupant of the seat 34.

A second embodiment of the present invention is shown schematically in FIG. 3. The second embodiment of the invention comprises an apparatus 100 for sensing and restraining an occupant of a vehicle. Certain parts of the apparatus 100 are substantially the same as corresponding parts of the apparatus 10 described above with reference to the first embodiment of the invention, as indicated by the same reference numbers used in FIGS. 1 and 3. The apparatus 100 thus includes an air bag 26 which is inflated into a vehicle occupant compartment 24 between a vehicle instrument panel 22 and a vehicle seat 34 upon the occurrence of a crash.

As in the apparatus 10, the inflation fluid directed into the air bag 26 in the apparatus 100 is controlled in response to a computed weight of an occupant of the seat 34. The computed weight of the occupant is determined by a controller 36 as a function of a sensed weight indicated by a weight sensor 60, and further as a function of the inclination of the seat back assembly 52 as indicated by an incline sensor 62. The computed weight of the occupant is thus determined with reference to a portion of the occupant's weight that is applied to the seat back assembly 52 as a result of the inclination of the seat back assembly 52, as described above.

Another portion of the occupant's weight is usually applied directly to the vehicle floor 58 in front of the seat 34 by the occupant's feet resting on the floor 58. Like the portion of the occupant's weight that is applied to the seat back assembly 52, this portion of the occupant's weight is not transmitted to the weight sensor 60 in the seat cushion assembly 50. If the occupant's legs are extended fully so as to place both feet at a location spaced farthest from the seat 34, the portion of the occupant's weight that is applied directly to the floor 58 by the occupant's feet will have a minimum value. If the occupant's legs are retracted fully toward the seat 34 to place both feet in a position adjacent the seat 34, the portion of the occupant's weight that is applied directly to the floor 58 by the occupant's feet will have a maximum value. If both feet are spaced at intermediate distances from the seat 34, or are staggered at differing distances, the portion of the occupant's weight that is applied directly to the floor 58 by the occupant's feet will have an intermediate value. Therefore, the location of the occupant's feet on the floor 58 is a characteristic of the occupant that affects the difference between the actual weight of the occupant and the sensed weight indicated by the output signal from the weight sensor 60.

The apparatus 100 includes a plurality of foot sensors mounted on the floor 58 in front of the seat 34. The foot sensors include first, second and third foot sensors 80, 82 and 84, but a greater or lesser number of foot sensors could be used. The first, second and third foot sensors 80, 82 and 84 are spaced first, second and third distances from the seat 34, respectively. When one or both of the occupant's feet make contact with the first foot sensor 80, the first foot sensor 80 is actuated and provides an output signal which indicates that one or both of the occupant's feet are spaced the first distance from the seat 34. Each of the second and third foot sensors 82 and 84, when actuated, likewise provides an output signal respectively indicating that one or both of the occupant's feet are spaced the second or third distance from the seat 34. Such sensors for providing an output signal in response to contact by a vehicle occupant are known in the art.

Since the location of the occupant's feet on the floor 58 is a characteristic that affects the difference between the actual weight of the occupant and the sensed weight, output signals from the foot sensors 80, 82 and 84 indicate the effect that the location of the occupant's feet has on the sensed weight. For example, if only the first foot sensor 80 is actuated to provide an output signal indicating foot contact, the output signal would indicate that the maximum possible portion of the occupant's weight is being applied directly to the floor 58 by the occupant's feet. The output signal from the first foot sensor 80 would thus indicate a maximum difference between the actual weight of the occupant and the sensed weight as a result of the location of the occupant's feet.

The output signals from the foot sensors 80, 82 and 84 are received by the controller 36. The controller 36 determines a computed weight of the occupant as a function of both the sensed weight and the location of the occupant's feet. The controller 36 may have a look-up table for determining the computed weight on the basis of empirical foot location data, or may alternatively determine the computed weight by performing a computation based on a predetermined functional relationship between actual weight and foot location. Moreover, the controller 36 determines the computed weight further as a function of the reclining position of the seat back assembly 52, which is indicated by the output signal from the incline sensor 62, as described above. The computed weight determined by the controller 36 in the apparatus 100 thus approximates the actual weight of the occupant more closely, as compared with the sensed weight, because the effect of the location of the occupant's feet and the effect of the reclining position of the seat back assembly 52 are both considered in determining the computed weight.

Figure 4:
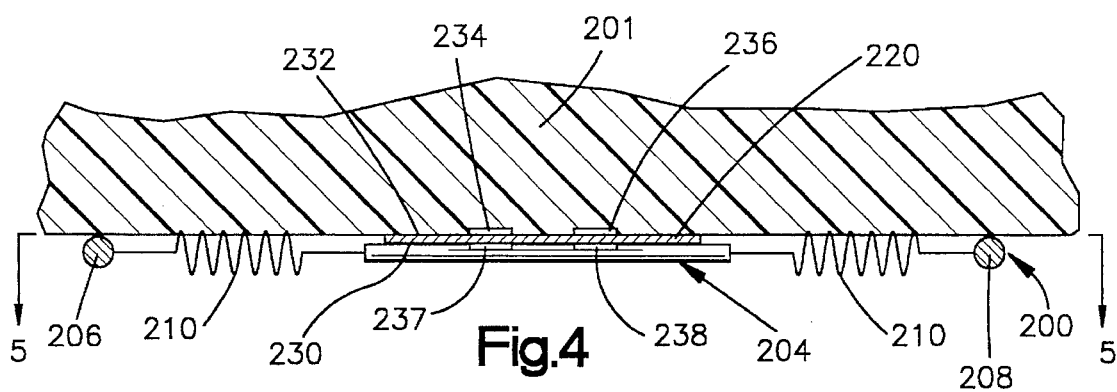
FIG. 4 is a schematic partial sectional view of a seat comprising an occupant weight sensor.
Figure 5:
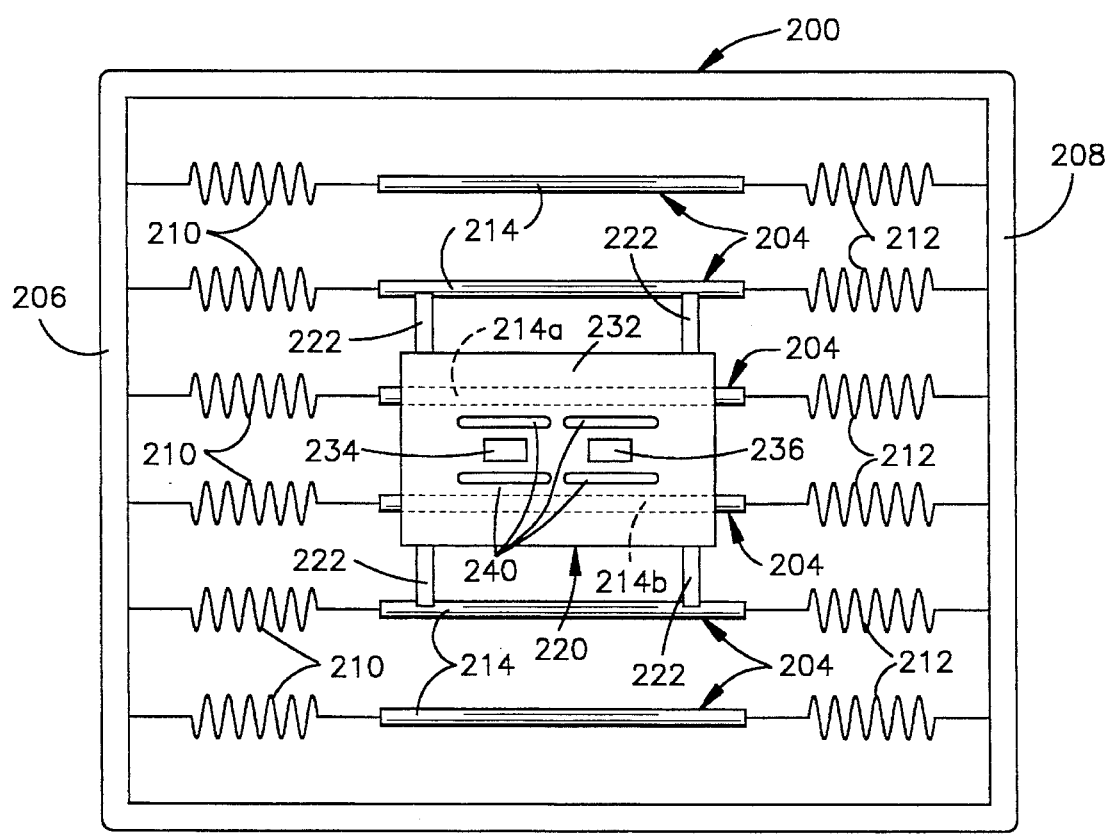
FIG. 5 is a view taken along the line 5—5 of FIG. 4.

FIGS. 4 and 5 illustrate a weight sensor which could be used in the embodiments of the invention described above as an alternative to the weight sensors 60. As shown in FIG. 4, a vehicle seat includes a seat frame 200 and a seat cushion 201 on which a vehicle occupant sits. The seat cushion 201 engages and is supported, at least in part, by a plurality of support assemblies 204. Each support assembly 204 extends between a seat frame part 206 and an opposite seat frame part 208. Each support assembly 204 includes a coil spring 210 connected to the seat frame part 206, a coil spring 212 connected to the seat frame part 208, and a support rod 214 connected at its opposite ends to the coil springs 210 and 212. The support rods 214 extend parallel to each other and are spaced apart from each other.

A weight sensor plate 220 is attached by suitable connectors 222 to a pair of the support rods 214a and 214b. The weight sensor plate 220 preferably has a rectangular shape, as shown in FIG. 5, but may alternatively have a different shape. One of the connectors 222 is located adjacent each corner of the weight sensor plate 220. The weight sensor plate 220, as shown in FIG. 4, is located above the support rods 214 and below the seat cushion 201 at the location where the weight of the occupant of the seat is mostly concentrated. That location may be directly below the center of the seat cushion 201 or offset from the center of the seat cushion 201. As shown in FIG. 4, the lower surface 230 of the weight sensor plate 220 engages the support rods 214a and 214b, and the upper surface 232 of the weight sensor plate 220 is held against the bottom surface 233 of the seat cushion 201 by the support rods 214a and 214b.

Alternatively, the weight sensor plate 220 could be located in the seat cushion 201. If the weight sensor plate 220 is located in the seat cushion 201, it is located beneath the upper half of the thickness of the seat cushion and in the lower half of the thickness of the seat cushion. The weight sensor plate 220 is preferably located adjacent to the bottom surface 233 of the seat cushion 201.

A first pair of strain gauges 234 and 236 are mounted on the upper surface 232 of the weight sensor plate 220. A second pair of strain gauges 237 and 238 are mounted on the lower surface 230 of the weight sensor plate 220. The strain gauges 234, 236, 237 and 238 are shown schematically in the drawings. The strain gauges respond to bending of the weight sensor plate 220. The weight sensor plate 220 bends in response to the occupant's weight being applied to the weight sensor plate 220. The weight sensor plate 220 may be provided with openings 240 to cause the bending of the weight sensor plate 22 to occur in the area of the strain gauges. The strain gauges are arranged in a circuit to provide a signal indicative of the occupant's weight as in the embodiments described above.

The sensed weight indicated by the alternative weight sensor shown in FIGS. 4 and 5 would approximate the occupant's actual weight. The controller 36 would then determine a computed weight as a function of the sensed weight indicated by the alternative weight sensor and further as a function of a characteristic as described above.

From the above description of the invention, those skilled in the art will perceive improvements, changes and modifications. For example, other controllable safety devices may be controlled in accordance with the present invention. Such devices include retractor or D-ring pretensioners, adjustable web clamps, variably controlled knee blockers, and controllable seats. Controllable seats include those that controllably move to prevent the vehicle occupant from submarining. In addition to the control of venting of an air bag as described above, air bag ignition timing can be controlled, multi-rate air bag inflators can be controlled, the throttling of the diffuser can be controlled, and the air bag can be aimed under the control of the disclosed system. It is intended to include all such modifications and alterations insofar as they come within the scope of the appended claims and the equivalents thereof.

Having described the invention, the following is claimed:

1. Apparatus comprising:
   means for sensing a sensed weight of an occupant of a vehicle seat, said sensed weight differing from the actual weight of the occupant;
   means for sensing a characteristic which affects the difference between said sensed weight and the actual weight of the occupant; and
   controller means for determining a computed weight of the occupant as a function of both said sensed weight and said characteristic.

2. Apparatus as defined in claim 1 wherein said sensed weight differs from the actual weight of the occupant by a first amount, said computed weight differing from the actual weight of the occupant by a second amount which is less than said first amount.

3. Apparatus as defined in claim 1 wherein said controller means stores a plurality of empirical weight values, a plurality of characteristic effect values, and a plurality of computed weight values corresponding to said empirical weight values and said characteristic effect values.

4. Apparatus as defined in claim 1 wherein said controller means comprises means for computing said computed weight as a function of both said sensed weight and said characteristic.

5. Apparatus as defined in claim 1 wherein said characteristic is the inclination of a seat back portion of the seat.

6. Apparatus as defined in claim 1 wherein said characteristic is the location of the occupant's feet relative to the seat.

7. Apparatus as defined in claim 6 wherein said means for sensing said characteristic includes means for sensing the distance between the occupant's feet and the seat.

8. Apparatus as defined in claim 1 further comprising restraint means for restraining the occupant, said restraint means being responsive to said controller means.

9. Apparatus comprising:
   a vehicle seat;
   means for sensing a sensed weight of an occupant of said seat, said sensed weight differing from the actual weight of the occupant by a first amount;
   means for sensing a characteristic which affects the difference between said sensed weight and the actual weight of the occupant;
   controller means for determining a computed weight of the occupant as a function of both said sensed weight and said characteristic, said computed weight differing from the actual weight of the occupant by a second amount which is less than said first amount; and
   restraint means for restraining the occupant, said restraint means being responsive to said controller means.

10. Apparatus as defined in claim 9 wherein said restraint means includes an inflatable vehicle occupant restraint, a source of inflation fluid, means for directing inflation fluid from said source into said restraint to inflate said restraint, and means for controlling said inflation fluid directed into said restraint in response to said computed weight.

11. Apparatus as defined in claim 10 wherein said means for controlling said inflation fluid includes means for venting inflation fluid away from said restraint.

12. Apparatus as defined in claim 9 wherein said seat includes a seat cushion assembly and a seat back assembly supported for inclination relative to said seat cushion assembly, said characteristic being the inclination of said seat back assembly relative to said seat cushion assembly.

13. Apparatus as defined in claim 12 wherein said controller means stores a plurality of empirical weight values, a plurality of inclination values, and a plurality of computed weight values corresponding to said empirical weight values and said inclination values.

14. Apparatus as defined in claim 12 wherein said controller means determines said computed weight as a function of both said sensed weight and said inclination.

15. Apparatus as defined in claim 9 wherein said seat is supported on a vehicle floor, said characteristic being the location of the occupant's feet on said floor.

16. Apparatus as defined in claim 15 wherein said means for sensing said characteristic includes means for sensing the distance between the occupant's feet and said seat.

17. Apparatus as defined in claim 16 wherein said controller means stores a plurality of empirical weight values, a plurality of distance values, and a plurality of computed weight values corresponding to said empirical weight values and said distance values.

18. Apparatus as defined in claim 16 wherein said controller means includes means for calculating said computed weight as a function of both said sensed weight and said distance.

19. Apparatus as defined in claim 9 wherein said seat includes a seat cushion having a bottom surface and support means for supporting said seat cushion, said support means including a support structure extending beneath said bottom surface, said means for sensing said sensed weight including a sensor member which responds to the occupant's weight, said sensor member being located above said support structure and adjacent to said bottom surface.

20. Apparatus as defined in claim 19 wherein said sensor member is located beneath the upper half of said seat cushion.

21. Apparatus as defined in claim 19 wherein said sensor member is located between said support structure and said bottom surface.

22. Apparatus as defined in claim 19 wherein said support structure holds said sensor member against said bottom surface.

23. Apparatus as defined in claim 19 wherein said sensor member bends under the influence of the occupant's weight, said means for sensing said sensed weight further including means for sensing bending of said sensor member.

24. Apparatus as defined in claim 23 wherein said means for sensing said sensed weight includes a plurality of strain gauges for sensing bending of said sensor member.

25. Apparatus comprising:

an inflatable vehicle occupant restraint;

a source of inflation fluid;

means for directing inflation fluid from said source into said restraint to inflate said restraint;

a vehicle seat including a seat cushion assembly and a seat back assembly supported for inclination relative to said seat cushion assembly;

means for sensing a sensed weight of an occupant of said seat, said sensed weight differing from the actual weight of the occupant by a first amount;

means for sensing said inclination of said seat back assembly;

controller means for determining a computed weight as a function of both said sensed weight and said inclination of said seat back assembly, said computed weight differing from the actual weight of the occupant by a second amount which is less than said first amount; and means for controlling said inflation fluid directed into said restraint in response to said computed weight.

26. Apparatus as defined in claim 25 wherein said means for controlling said inflation fluid includes means for venting inflation fluid away from said restraint.

27. Apparatus comprising:

a vehicle seat cushion having a bottom surface;

support means for supporting said seat cushion, said support means including a support structure extending beneath said bottom surface;

weight sensor means for sensing a sensed weight of a vehicle occupant seated on said seat cushion, said weight sensor means including a sensor member which responds to the occupant's weight, said sensor member being located above said support structure and adjacent to said bottom surface; and controller means for determining a computed weight of the occupant in response to an output signal from said weight sensor means, wherein said sensed weight differs from the actual weight of the occupant, said apparatus further comprising means for sensing a characteristic which affects the difference between said sensed weight and the actual weight of the occupant, said controller means determining said computed weight of the occupant as a function of both said sensed weight and said characteristic.

28. Apparatus as defined in claim 27 wherein said sensor member is located beneath the upper half of said seat cushion.

29. Apparatus as defined in claim 27 wherein said sensor member is located between said support structure and said bottom surface.

30. Apparatus as defined in claim 27 wherein said support structure holds said sensor member against said bottom surface.

31. Apparatus as defined in claim 27 wherein said sensor member bends under the influence of the occupant's weight, said weight sensor means further including means for sensing bending of said sensor member.

32. Apparatus as defined in claim 31 wherein said weight sensor means includes a plurality of strain gauges for sensing bending of said sensor member.

33. Apparatus as defined in claim 27 further comprising restraint means for restraining the occupant, said restraint means being responsive to said controller means.

34. A method of determining the weight of an occupant of a vehicle seat, said method comprising the steps of:

sensing a sensed weight of the occupant of the seat, said sensed weight differing from the actual weight of the occupant;

sensing a characteristic which affects the difference between said sensed weight and the actual weight of the occupant; and determining a computed weight of the occupant as a function of both said sensed weight and said characteristic.

35. A method as defined in claim 34 wherein said sensed weight differs from the actual weight of the occupant by a first amount, said computed weight differing from the actual weight of the occupant by a second amount which is less than said first amount.

36. A method as defined in claim 34 further comprising the step of storing a plurality of sensed weight values, a plurality of characteristic effect values, and a plurality of computed weight values corresponding to said sensed weight values and said characteristic effect values, said step of determining said computed weight comprising the step of identifying one of said stored computed weight values.

37. A method as defined in claim 34 wherein said step of determining said computed weight includes the step of computing said computed weight as a function of both said sensed weight and said characteristic.

38. A method as defined in claim 34 wherein said characteristic is the inclination of a seat back portion of the seat.

39. A method as defined in claim 34 wherein said characteristic is the location of the occupant's feet relative to the seat.

40. A method as defined in claim 39 wherein said step of sensing said characteristic comprises the step of sensing the distance between the occupant's feet and the seat.

41. A method as defined in claim 34 further comprising the step of restraining the occupant in response to said computed weight.

\* \* \* \* \*